J. W. & E. H. SMITH.
VALVE.
APPLICATION FILED JULY 21, 1910.

987,757.

Patented Mar. 28, 1911.

WITNESSES

INVENTORS
JOHN W. SMITH
ELMER H. SMITH
BY Paul & Paul
ATTORNEYS

UNITED STATES PATENT OFFICE.

JOHN W. SMITH AND ELMER H. SMITH, OF MINNEAPOLIS, MINNESOTA.

VALVE.

987,757.

Specification of Letters Patent. Patented Mar. 28, 1911.

Application filed July 21, 1910. Serial No. 573,120.

*To all whom it may concern:*

Be it known that we, JOHN W. SMITH and ELMER H. SMITH, of Minneapolis, Hennepin county, Minnesota, have invented certain new and useful Improvements in Valves, of which the following is a specification.

Our invention relates to valves and particularly to those for use with internal combustion engines where the carbon resulting from the explosive mixture soon causes the face of an ordinary valve to become pitted and in a short time necessitates re-grinding.

A further object is to provide a valve disk which will not warp or twist, as a steel disk will frequently do when subjected to varying temperatures to which the valves of an internal combustion engine are frequently subjected.

The object of our invention is to provide a valve which will be extremely durable and will not be affected by the carbons to which the faces of the valves are exposed.

Our invention consists generally in a metal disk having a central orifice and a stem fitting therein, the end of the stem and the walls of the orifice being fused together by an oxy-acetylene torch or other suitable process.

Further the invention consists in various constructions and combinations, all as hereinafter described and particularly pointed out in the claims.

Figure 1:
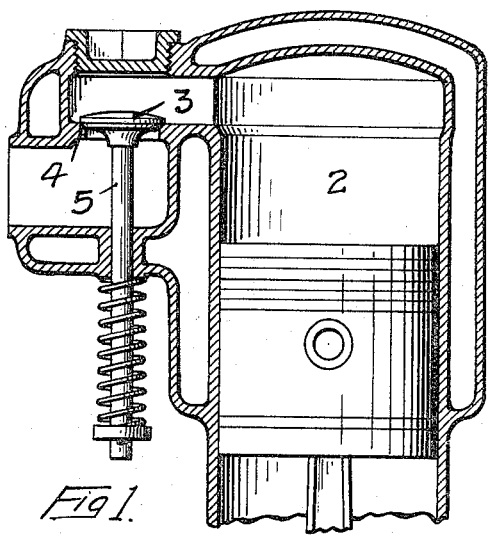
Figure 3:
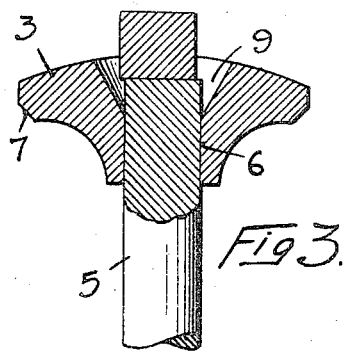
Figure 2:
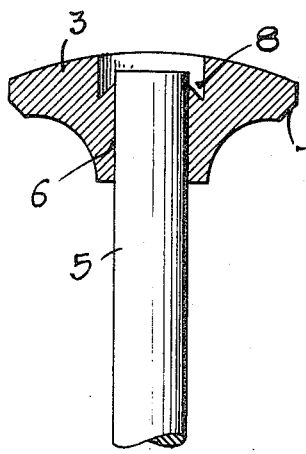
Figure 7:
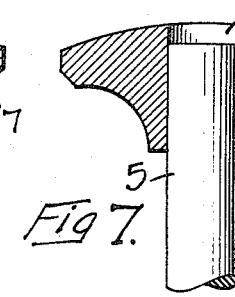
Figure 4:
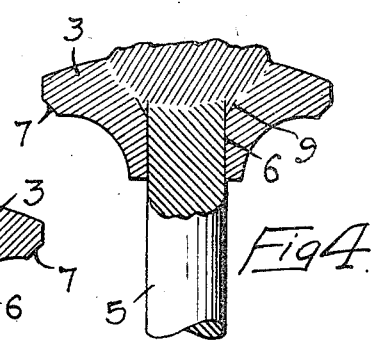
Figure 6:
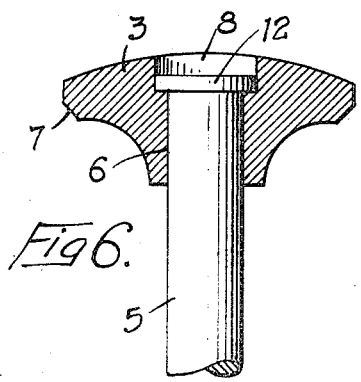
Figure 5:
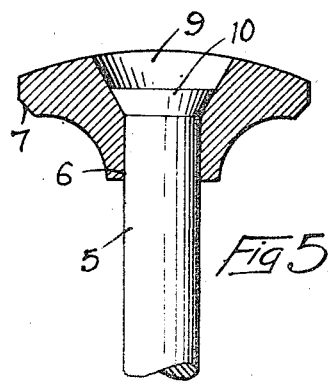

In the accompanying drawings forming part of this specification, Figure 1 is a sectional view of a portion of a gas engine, illustrating the position of the valve therein, Fig. 2 is a detail sectional view through the valve disk, Fig. 3 illustrates a modified construction in the form of the socket in the disk, with the metal in place to be fused and fill the recess, Fig. 4 illustrates the end of the stem and the supplemental block or piece of metal fused to mingle with the stem and fill the recess in the disk, Fig. 5 illustrates a modification in the form of the stem, showing an enlarged end fitting within a flaring recess in the disk, Fig. 6 illustrates a disk on the end of the stem fitting within a recess in the disk that is provided with a flat bottom, Fig. 7 is a view of another modification in the form of the disk orifice.

In the drawing, 2 represents the cylinder of an internal combustion engine, 3 a valve disk preferably of cast metal having a seat 4 and a stem 5 preferably of steel. The disk has a central orifice 6 and a beveled face 7. The orifice preferably terminates at its upper end in a recess 8 of greater cross sectional area than the orifice. The end of the stem projects into the orifice and preferably into the recess and by the application of an oxy-acetylene torch or other suitable means the end of the stem and the orifice wall are fused together, the metal flowing and uniting into one solid mass. The torch is then applied to a stick or block of metal until the recess, the walls thereof and the stem are united in one homogeneous mass, the orifice being filled and the stem concealed, and when the surface of the disk is finished off the stem and disk will be so firmly united that to all appearances they will constitute but one piece of metal.

Various forms of recesses may be employed, in Fig. 3 one being shown, indicated by reference numeral 9 and having flaring side walls, and in Fig. 5 a different form of stem is shown having a head 10 fitting snugly against the walls of the recess when the parts are assembled. Fig. 6 illustrates another form of recess having a flat bottom, the stem or head 12 fitting snugly within the recess and resting upon the bottom.

In Fig. 7 the orifice is shown of substantially the same diameter from end to end. With this construction the stem is fused into the walls of the orifice, thereby forming a complete union between them, and this fusing may be carried for a sufficient distance on the surface of the stem until the parts are securely locked together.

Fig. 7 shows the orifice extending entirely through the disk, but it may be carried only partially therethrough, its walls and the end of the stem being fused together in the manner described. A valve of this kind is particularly serviceable where there is a continuous shock or strain on the valve disk due from contact with its seat which would in a short time separate the disk and stem secured together by threads, pins, or other well-known means.

In various ways the details of construction herein may be modified without departing from the scope of our invention.

We claim as our invention:—

1. A valve comprising a metal disk having a central orifice extending therethrough, a metallic stem fitting into said orifice and extending partially through the disk, the end of said stem being fused and the orifice being filled with metal to unite with the fused end of the stem, substantially as described.

2. A valve for internal combustion engines comprising a disk having a central orifice therethrough, a stem fitting within said orifice and extending into the disk, said orifice being enlarged at one end and said stem projecting into the enlarged portion of said orifice, the end of said stem being fused within said orifice to partially fill the enlarged portion thereof, and the remaining portion of the orifice being filled with metal which unites with the fused portion of said stem, substantially as described.

3. A valve for internal combustion engines comprising a cast iron disk having a central orifice therein terminating at one end in a flaring recess, a steel stem fitting into said orifice, the end of said stem and the walls of said orifice being fused together and uniting to form a homogeneous mass, and the shape of said recess causing the end of said stem when fused to assume a wedge form, thereby locking it in said orifice, substantially as described.

4. A valve comprising a metal disk having an orifice, a metallic stem fitting into said orifice, the end of said stem being fused and the orifice being filled with metal to unite with the fused end of the stem.

5. A valve comprising a metallic disk having an orifice provided with a recess, a metallic stem fitting said orifice, the end of said stem and the walls of said orifice being fused in said recess and uniting to form a homogeneous mass, the shape of said recess allowing the end of said stem to assume a greater cross sectional area than the main portion thereof, thereby locking it in said orifice.

6. A valve comprising a metallic disk having an orifice, a metallic stem fitting into said orifice, the end of said stem and the walls of said orifice being fused and uniting to form a homogeneous mass, whereby said stem and disk will be securely locked together.

In witness whereof, we have hereunto set our hands this 14th day of July 1910.

JOHN W. SMITH.
ELMER H. SMITH.

Witnesses:
GENEVIEVE E. SORENSEN,
J. A. BYRNES.